United States Patent

[11] 3,617,716

| [72] | Inventor | Hansrichard Schulz<br>Villingen/Black Forest, Germany |
|---|---|---|
| [21] | Appl. No. | 794,479 |
| [22] | Filed | Jan. 23, 1969 |
| [45] | Patented | Nov. 2, 1971 |
| [73] | Assignee | Saba Schwarzwaelder Apparate-Bau-<br>Anstalt August Schwer Soehne GmbH<br>Villingen/Black Forest, Germany |
| [32] | Priority | Jan. 27, 1968 |
| [33] | | Germany |
| [31] | | P 15 74 604.0 |

[54] METHOD AND ARRANGEMENT FOR EXTRAPOLATION OF A CONTINUOUS FUNCTION
12 Claims, 2 Drawing Figs.

[52] U.S. Cl. .................................................... 235/152, 235/151, 235/151.13
[51] Int. Cl. ................................................... G06f 7/38, G06f 15/34
[50] Field of Search .......................................... 235/152, 151.11, 150.1, 151.13, 150.23, 151

[56] References Cited
UNITED STATES PATENTS

| 3,246,130 | 4/1966 | Rubin .......................... | 235/152 |
| 3,247,365 | 4/1966 | Dell et al. ..................... | 235/152 X |
| 3,325,630 | 6/1967 | Murakami .................... | 235/152 X |
| 3,412,240 | 10/1968 | Hunt et al. .................... | 235/152 X |

Primary Examiner—Malcolm A. Morrison
Assistant Examiner—James F. Gottman
Attorney—Michael S. Striker ABSTRACT: Extrapolated values of a continuous function of an independent variable are computed for a given extrapolation range of the independent variable by measuring the function at predetermined values of the independent variable within a measurement range of said variable. The measured values are combined according to the Lagrange interpolation formula to generate one extrapolated value of the function which is then stored and used as a pseudomeasurement signal during the computation of the subsequent extrapolated value.

METHOD AND ARRANGEMENT FOR EXTRAPOLATION OF A CONTINUOUS FUNCTION

BACKGROUND OF THE INVENTION

This invention relates to a method and arrangement for generating extrapolated values of a continuous function within an extrapolation range adjacent to a measurement range of said independent variable during which values of said function are measured.

So far, it is only known to generate an approximation of a function for the near future by linearizing this function within a certain range of the near past and by linearly extrapolating this function. Of course, this method is not very exact. Whereas a lot of more exact methods of interpolation are known, for example a method using members with higher order of the formula of Lagrange, it is not yet known to generate extrapolated values in another way than the way described.

SUMMARY OF THE INVENTION

If the independent variable is time ($t$) then the object of the invention may be to generate an approximation of a function $f(x, y, t)$ with position coordinates $x, y$ for the near future $t > t_G$ where $t_G$ indicates the present. In general the extrapolation is carried out by using the interpolation formula of Lagrange to generate an extrapolated value for time $t$ by using measured values of the function which have occurred in the near past at a number of different time instants $t_m < t_G$ ($m=0, 1, 2 ... M$). This type of computation is only valid as long as the function is continuous throughout the extrapolated region as well as throughout the measurement range or region. This type of continuous function can be counted upon for, for example, relatively slowly changing meteorological measurements as for example air temperature, air pressure, humidity, or the concentration of gases in the atmosphere.

The arrangement in accordance with this invention thus comprises means for generating measurement signals signifying the value of the continuous function at selected values of said independent variable within a measurement range adjacent to said extrapolation range. It further comprises coefficient storing means for storing coefficient signals corresponding to the constant coefficients of the interpolation formula used, which may for example be the Lagrange formula. The invention further comprises computing means for combining the measurement signals with corresponding coefficient signals in accordance with the interpolation formula, thus generating the extrapolation signals. The computing means may for example comprise program means connected to storage means for storing the measurement signals and coefficient storing means for storing the coefficients required by the interpolation formula. These program means then furnish the corresponding signals from the two storage means to multiplier means which generate a partial product which in turn is stored in product storage means. These partial products are then furnished to adder means whose output comprises the extrapolation signals.

In a further extension of this invention the extrapolation range may be divided into a determined number of smaller ranges and extrapolated values of the function derived. The extrapolated value may then be applied to the program means by means of additional storage means in such a manner that they are processed as pseudomeasurement signals.

When this type of operation is used, it is desirable to chose the intervals at which the measurement signals are derived, for example intervals $T$ if the independent variable is time ($t$) to be of such a magnitude that the time interval $M \cdot T$ (where $M+1$ is equal to the number of measurements made) is larger than one-tenth of the desired maximum extrapolation range, $(t-t_G)_{max}$, where $t_G$ indicate the present time.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
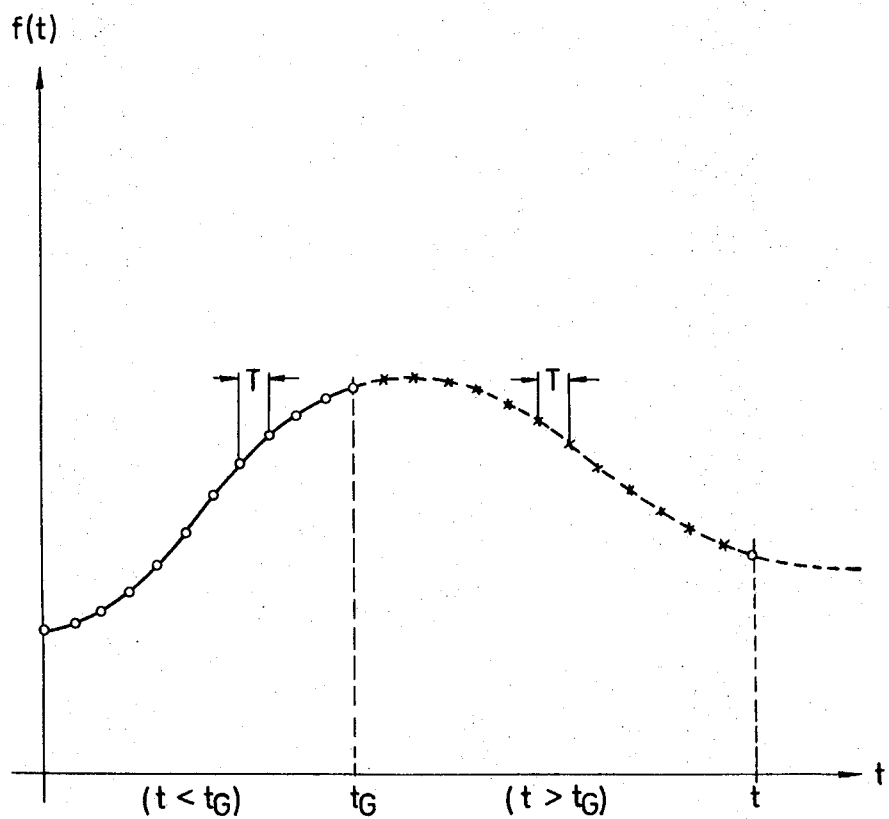
FIG. 1 shows an arbitrary continuous function $f(t)$ at a location $(x, y)$.

The preferred embodiment will now be described with reference to the FIGS. In particular it will show an arrangement for generating extrapolated values of a function $f(x, y, t)$ for the near future $t > t_G$ from ($M+1$) measured values of the function taken in the closest possible past, by use of a rational function of degree $M$ in accordance with the interpolation formula of Lagrange. The extrapolated value of the function thus derived is the closest possible approximation which may be obtained from this interpolation formula for the given number ($M+1$) of measured values.

The interpolation formula of Lagrange is the following:

(1)
$$f(x, y, t) = \sum_{m=0}^{m=M} C_m f_m(x, y, t)$$

wherein $C_m$ is defined as follows:

(2)
$$C_m = \frac{\left| \prod_{k=0}^{k=m} (t - t_k) \cdot q_{km} \right|}{\left| \prod_{r=0}^{r=m} (t_m - t_r) \cdot q_{rm} \right|}$$

where the symbols $q_{km}$ and $q_{rm}$ are defined as follows:

$q_{km} = 1$ for $k \neq m$
$q_{km}$ not existent for $k = m$
$q_{rm} = 1$ for $r \neq m$
$q_{rm}$ not existent for $r = m$ In accordance with this invention the interpolation formula (1) of Lagrange is used for extrapolation. The values of the independent variable, in this case time, at which the measured values or measurement signals are derived are denoted by $t_m$ and take place at regular intervals $T$ chosen in such a way that the total measurement range of the independent variable, that is the time period $M \cdot T$ is at least one-tenth of the desired extrapolation range in this case $(t-t_G)_{max}$. A further requirement is that the number of measurement signals ($M+1$) is larger than the ratio of the maximum extrapolation range $(t-t_{Gmax})$ to the total measuring range, $M \cdot T$ as follows:

(3)
$$(M+1) > \frac{(t-t_G)_{max}}{M \cdot T}$$

Solving this equation and simplifying leads to the following requirement for $M$:

(4)
$$M > \sqrt{\frac{(t-t_G)_{max}}{T}}$$

If for example measurement signals are derived at intervals $T=1$ min. and the maximum extrapolation range is to be 100 min., then $M$ must be greater than $\sqrt{100} = 10$.

The above requirements must be met if sufficient accuracy is to be obtained.

Computation of the coefficient $C_m$ in accordance with the equation (2) for extrapolation ranges $(t-t_G)$ which are large relative to the interval $T$ of two consecutive measurements results in values of $C_m$ which have high-numerical values and alternate in sign for increasing values of the index $m$. Summing the partial product resulting from the multiplication of $C_m$ and the corresponding measurement value $f(x, y, t_m)$ then leads to rather large errors resulting from the subtraction of one large quantity from another to which it is closely equal. Furthermore, the high number of digits required for the coefficient $C_m$ and the product $C_m \cdot f(x, y, t_m)$ results in a relatively expensive computing arrangement.

In accordance with this invention this difficulty is avoided as follows. The extrapolation is carried out by first finding the extrapolated value for a small fraction of the total extrapolation range. This requires fewer digits in the coefficient $C_m$ and in the partial product. The smaller number of digits results in smaller errors which may be further decreased by using statistical means instead of the direct values of the measurement signals. Of course the errors are smaller, the smaller the extrapolated time. In the extreme case to be discussed below, the extrapolation range for the first computation may for example be $(t-t_G)=T$, that is the extrapolation range is equal to the value of the interval between the generation of two adjacent measurement signals. In this case the value of the function will be computed for time $t=t_G+T$.

The extrapolated value of the function at time $t=t_G+T$ which is so derived may then be used as a psuedomeasurement valve in deriving the second extrapolated value of the function, namely the value of the function at time $t-t_G=2T$. In this case a total of $M+2$ measurement signals or values are available for the second computation. The last measurement value of course corresponds to the time $t=t_G+T$.

A new coefficient $C_m^{(2)}$ then is formed from the number of measurement signals or values which is now equal to $M+2$. This is then used in extrapolation of the value of the function for time $t=t_G+2T$. The further extrapolation computations may then continue in the same fashion, always using the values computed during the previous computation as additional pseudomeasurement values, the time interval between extrapolated values being $T$ throughout (see also FIG. 1).

In accordance with FIG. 1 a continuous function $f(t)$ is shown whose value is measured up to time $t_G$ in regular intervals $T$, then the computing arrangement in accordance with this invention is used to compute the value of the function for time $t > t_G$.

The size, number, and sign of the coefficient $C_m$ in equation (1) depends on the number of measurement values, either measured or computed pseudomeasurement values, used for the computation. For this reason in accordance with a further extension of this invention it is proposed that the number of measurement signals be fixed to $M+1$. This will result in a decrease of accuracy, but will lead to saving both in the storage space necessary for the coefficients and in the program as well as leading to a simplification of the actual computation process. It has the advantage that the same coefficients both in number and in magnitude are always furnished by the coefficient storing means.

Thus as the number of the computation in the extrapolation range advances, the oldest measured values, for example at first $f(t_o)$, are discarded. The extrapolation computation may be carried out in a time period which is very small compared to the time interval $T$, since the computation speed of electronic computers is very high.

Thus, in accordance with this invention each extrapolation computation is carried out using the previous computed value as a pseudomeasurement value, while the oldest measured value is discarded.

Thus the first computation is carried out in accordance with the interpolation equation (1), while the second computation proceeds according to equation $$(5) \quad f(x, y, t=t_G+2T) = \sum_{m=0}^{m=M} C_m \cdot f(x, y, t_{m+1})$$

In general the following equation applies for this simplified method for the $n$th computation:

$$(6) \quad f(x, y, t=t_G+nT) = \sum_{m=0}^{m=M} C_m \cdot f(x, y, t_{m+n-1})$$

In order to decrease errors due to measuring errors, means may be furnished for deriving a mean value from a plurality of measurement signals (for example 5 or 10 measurement signals may be averaged). Of course, the number of measurement signals or measurement values furnished by the measuring means in the time interval, for example $T$, must be correspondingly increased.

A further feature of the invention consists of storing the extrapolated value until the measurement value corresponding to the same time has been furnished, comparing the two values, and generating an error signal if they are unequal by more than a predetermined difference.

Alternatively the difference between the two values may be used to compute the absolute error. This may be divided by the measured value to give the relative error, and the error signal may be generated only when the relative value of the error signal exceeds a predetermined value of, for example, plus or minus 10 percent.

Figure 2:
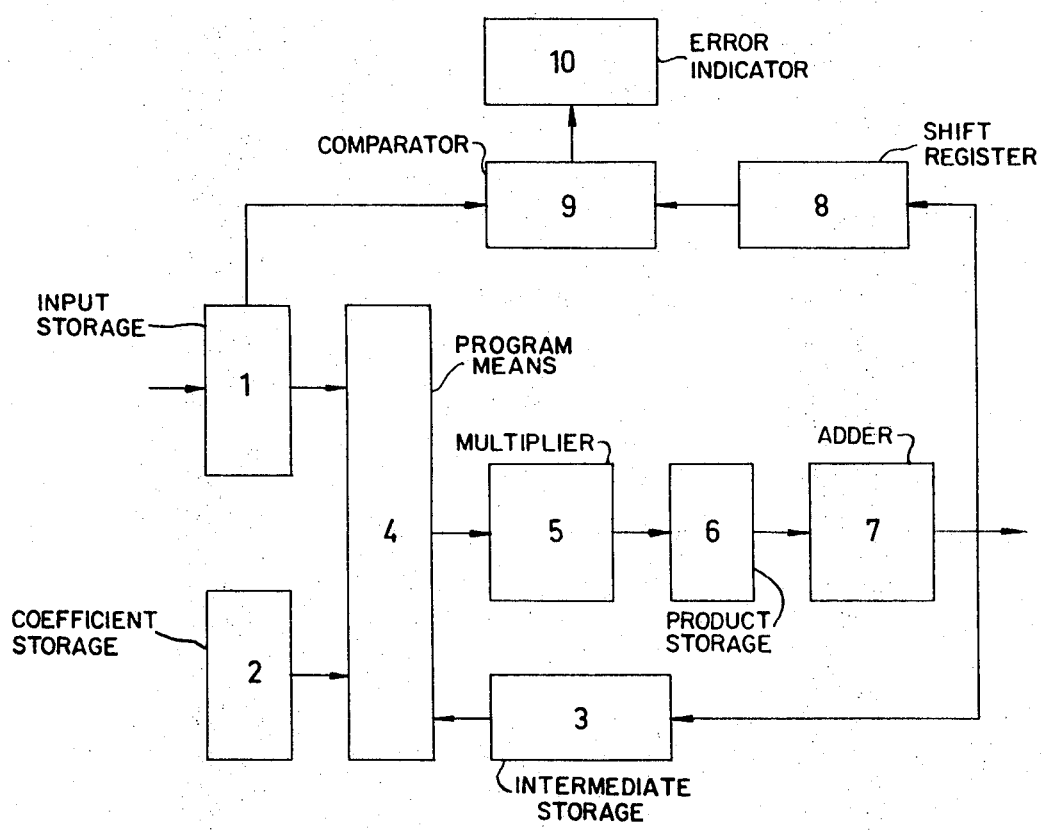
FIG. 2 is a block diagram of the arrangement in accordance with this invention.

The exact operation of the arrangement in accordance with this invention will be described with reference to FIG. 2. Measurement signals are generated by measurement means which are not illustrated in the FIG. The measurement signals derived within a particular time period are stored in storage means, here an input storage 1. They are stored in the same order in which they were generated. Thus after a time $T$, that is at the new "present" time $t_G^\circ=t_G+T$ the newest measurement signal or value is entered and all previous values are shifted one position. Thus the oldest measurement signal is extinguished so that the same number of measurement signals is always stored in storage 1.

The reference symbol 2 designates coefficient storing means for storing the constant coefficient $C_m$ of the Lagrange interpolation formula for the time $t_n=t_G+n \cdot T$ ($n=0, 1 ... N$). These values remain unchanged throughout, since they only depend upon the time period chosen for extrapolation in the region $t_G<t<t_G+N \cdot T$ and are independent of the measurement signals which vary with time. For each index $n$ the first method requires $(M+1+n)$ coefficients since the $n$ psuedomeasurement values which, as will be explained below are stored in additional storage 3 are also used as measurement values. If the computation is carried out in accordance with the second method a total of $(M+1)$ stored coefficients is sufficient.

The input storage 1, the coefficients storing means 2 and the additional storage means 3 which store the psuedomeasurement signal are all connected to a program means 4 which furnishes the coefficients $C_m$ and the corresponding measurement signals $f_m$ to multiplier 5 which generates product signals which are stored in a product storage 6. The product $C_m \cdot f_m$ are thus stored in storage 6. The values stored therein are summed in adder means 7 whose output comprises the extrapolation signals $f(x, y, t)$. The values represented by the signals may be printed out or indicated. Further they are supplied to the additional storage 3, as well as to a second additional storage means 8 which may for example be a shift register. The values temporarily stored in shift register 8, after the appropriate time has elapsed, are compared in comparator means 9 to the measurement signal generated at said time. The difference value resulting from the comparison may be divided by the measured value and an error signal may be indicated if this relative error exceeds a predetermined value.

Of course the independent variable may be a variable other than time. In this case values measured over an accessible region of $x$ may be used for extrapolating the function over an inaccessible region of $x$ bordering on the measurement region. Of course the accuracy will decrease with distance from the measurement range.

Furthermore, other interpolation formulas, such as for example that of Newton or Taylor series may be used instead of the interpolation formula of Lagrange. By suitable mathematical manipulation these formulas too may make use of constant coefficients which only depend upon the independent variable. The same arrangement may then be used.

While the invention has been illustrated and described as embodied in a particular circuit arrangement, it is not intended to be limited to the details shown, since various modifications and circuit changes may be made without departing in any way from the spirit of the present invention.

What is claimed as new and desired to be protected by Letters Patent is set forth in the appended claims:

1. Arrangement for furnishing extrapolation signals corresponding to extrapolated values of a continuous function of an independent variable for a determined extrapolation range of said independent variable, in accordance with a nonlinear interpolation formula, comprising, in combination, means furnishing measurement signals signifying the value of said function corresponding to at least three selected values of said independent variable within a determined measurement range adjacent to said extrapolation range; coefficient storing means for storing coefficient signals corresponding to the coefficients required by said interpolation formula; and computing means operatively associated with said means furnishing measurement signals and said coefficient-storing means, for combining said measurement signals and said coefficient signals in accordance with said interpolation formula, thereby furnishing an extrapolation signal.

2. An arrangement as set forth in claim 1 wherein said interpolation formula is the Lagrange formula.

3. An arrangement as set forth in claim 1, wherein said means furnishing measurement signals comprise input storage means storing said measurement signals in a determined order relative to the direction of change of said independent variable; and wherein said computing means comprise program means connected to said input storage means and said coefficient-storing means for furnishing first and second program signals as a function of said measurement signals and said coefficient signals respectively; multiplier means for multiplying said first and second program signals, thus furnishing a product signal; product storage means for storing said product signals and furnishing stored product signals; and adder means for adding said stored product signals, thus furnishing said extrapolation signals.

4. An arrangement as set forth in claim 3 further comprising additional storage means connected to said adder means for storing each of said extrapolation signals; and connecting means connecting said additional storage means to said program means in such a manner that each stored extrapolation signal constitutes a pseudomeasurement signal.

5. An arrangement as set forth in claim 4 wherein said independent variable is time, $t$, and wherein said selected values of said independent variable are values occuring at regular intervals $T$ of said independent variable $t$; wherein said measurement range ends and said extrapolation range begins at the value $t_G$; wherein the number of said stored measurement signals is $M+1$; and wherein:

$$M \cdot T > 0.1(t-t_G).$$

6. An arrangement as set forth in claim 5 wherein the number of measurement signals $M+1$ is defined by the following inequality:

$$M+1 > \frac{(t-t_G)_{max}}{M \cdot T}$$

7. An arrangement as set forth in claim 6 wherein said input storage means comprise shift register means for storing $M+1$ measurement signals; and wherein measurement signals corresponding to values of the independent variable furthest removed from the extrapolation range are discarded upon receipt of values closer to said range.

8. An arrangement as set forth in claim 1, also comprising second additional storage means operatively associated with said computing means, for storing said extrapolation signals and furnishing comparison signals corresponding to stored values of said extrapolation signals; comparator means operatively associated with said second additional storage means and said means furnishing measurement signals, for comparing each of said comparison signals to a measurement signal occurring at the value of the independent variable for which said extrapolation signal was derived, and generating an error signal if the difference between the two compared signals exceeds a predetermined value; and indicator means operatively associated with said comparator means, and responsive to said error signal for furnishing an indication thereof.

9. A method for generating extrapolation signals corresponding to values of a continuous function of an independent variable within a determined extrapolation range of said independent variable in accordance with an interpolation formula, comprising, in combination, the steps of furnishing measurement signals signifying the value of said function corresponding to selected values of said independent variable within a determined measurement range adjacent to said extrapolation range; computing a first extrapolation signal signifying the extrapolated value of said function for a given value of said independent variable within said extrapolation range; storing said extrapolation signal; and computing a second extrapolation signal for a value of said independent variable further removed from said measurement range than said given value, using said first extrapolation signal as a pseudomeasurement signal.

10. A method as set forth in claim 9, wherein said interpolation formula is a nonlinear formula; wherein said independent variable is time, said measurement range comprising a determined past interval, said extrapolation range comprising a determined future interval.

11. A method as set forth in claim 10, wherein the time interval between consecutive measurement signals is constant.

12. A method as set forth in claim 9, further comprising the step of discarding the measuring signal corresponding to the value of the independent variable furthest removed from said extrapolation range prior to computing said second extrapolation signal.

* * * * *